(12) United States Patent
Zielewicz (10) Patent No.: US 6,305,453 B1
(45) Date of Patent: Oct. 23, 2001

(54) TIRE BEAD BREAKER

(76) Inventor: Robert Zielewicz, 198 Deyo Hill Rd., Johnson City, NY (US) 13790

( * ) Notice: Subject to any disclaimer, the term of this patent is extended or adjusted under 35 U.S.C. 154(b) by 0 days.

(21) Appl. No.: 09/560,611

(22) Filed: Apr. 28, 2000

(51) Int. Cl.$^7$ ................................................ B60C 25/125
(52) U.S. Cl. .......................................... 157/1.26; 157/1.1
(58) Field of Search ........................ 157/1.17, 1.26, 157/1.28, 1.1

(56) References Cited

U.S. PATENT DOCUMENTS

| | | | |
|---|---|---|---|
| 2,616,487 | * 11/1952 | Parks | 157/1.26 |
| 2,760,563 | 8/1956 | Bishman | 157/1.26 |
| 2,842,191 | * 7/1958 | Coats | 157/1.26 |
| 3,006,404 | * 10/1961 | Marshall | 157/1.26 |
| 3,113,609 | 12/1963 | Bishman | 157/1.17 |
| 3,142,330 | * 7/1964 | Nelson | 157/1.26 |
| 4,059,140 | * 11/1977 | Sedgwick | 157/1.17 |
| 4,222,426 | * 9/1980 | Brosene, Jr. | 157/1.17 |
| 4,304,283 | * 12/1981 | Poulin | 157/1.2 |
| 4,335,772 | * 6/1982 | Bubik et al. | 157/1.28 |
| 4,462,451 | 7/1984 | Ogren | 157/1.17 |
| 4,969,498 | 11/1990 | Sheets | 157/1.17 |

* cited by examiner

Primary Examiner—Joseph J. Hail, III
Assistant Examiner—David B. Thomas
(74) Attorney, Agent, or Firm—Salzman & Levy (57) ABSTRACT

A portable, lightweight, tire bead breaking apparatus includes a vertically oriented frame disposed upon a wheeled base. A hydraulically actuated ram is pivotally mounted to the frame. A bead breaking shoe is attached to a distal end of the ram, and engages the beaded edge of a tire mounted upon a swivel pan rotatably mounted to the base. The bead breaking operator is able to simultaneously operate the ram, while rotating the tire disposed upon the swivel pan.

18 Claims, 7 Drawing Sheets

TIRE BEAD BREAKER

FIELD OF THE INVENTION

The present invention relates to tire changing equipment and, more particularly, to a bead breaking machine for separating a tire from its rim or wheel.

BACKGROUND OF THE INVENTION

Many machines are available today for breaking the bead of a pneumatic tire. One such machine is shown in U.S. Pat. No. 4,969,498, issued to Sheets on Nov. 13, 1990, entitled TIRE BEAD BREAKER. This bead breaking device features a levered foot member that is stabilized by an elongated upper bar. Another such machine is shown in U.S. Pat. No. 3,113,609, issued on Apr. 5, 1961 to Bishman for TIRE CHANGER. The Bishman tire changer apparatus comprises a center shaft that supports a wheel that is secured in the device by a wheel chuck and retainer pin. A mounting or demounting tool is placed between the tire and the rim. A bead breaking foot is employed to bear against the tire and separate it from the wheel rim.

In U.S. Pat. No. 4,222,426, issued to Brosene, Jr. on Sep. 16, 1980, entitled BEAD BREAKER MECHANISM FOR A TIRE CHANGING MACHINE, a bead breaker is shown that employs a pivoting bead breaking foot. The pivoting foot adjusts itself into the proper bead breaking position, thus pushing the tire away from the rim.

In U.S. Pat. No. 4,335,772, issued to Bubik et al on Jun. 22, 1982 for TIRE CHANGING MACHINE, a bead breaking mechanism is illustrated wherein upper and lower bead breaking shoes are hydraulically, bi-directionally actuated upon diametrically opposite sides of the wheel.

In U.S. Pat. No. 4,059,140, issued on Nov. 22, 1977 to Sedgwick, entitled TIRE CHANGING MACHINE, a hydraulic cylinder with a bead engaging tool is depicted. The cylinder pivots so the bead engaging tool will bear against the bead of the tire.

In U.S. Pa. No. 3,142,330, issued to Nelson on Jul. 28, 1964 for MACHINE FOR UNSEATING TIRE BEADS, a machine is illustrated that provides a lever system that pivots about a center stanchion. Two pistons are used to control the pusher foot placement.

In U.S. Pat. No. 4,462,451, issued to Ogren on Jul. 31, 1984, entitled METHOD AND APPARATUS FOR REMOVING TIRES FROM RIMS, a tire is dismounted from its rim by a ram that first pushes and then pulls the rim from the tire. The push force is directed away from the rim.

All of the aforementioned machines work fairly well, in that they all accomplish their intended purpose of breaking the bead on tires. However, as any tire mechanic will verify, different types of machines present individualized drawbacks, and there are large discrepancies between units with respect to their convenience, portability, and cost.

Generally, those machines that have levered or leveraged pivot arms present cumbersome and overly complicated apparatuses that are often difficult to position properly with respect to the tire and wheel.

Many of the known devices are heavy, non-portable units, designed to be rugged and powerful in order to break the bead on heavy duty tires, such as truck and construction equipment type tires. Such machines, unfortunately, are often expensive and difficult to operate.

Many of the smaller portable devices are dependent on human force to work and do not supply enough power to break the beads on truck or heavy duty construction equipment. Also, small portable units for heavy duty construction equipment tires are very slow to operate and require frequent remounting to the rim to break the bead on the entire diameter.

Most breakers apply the force out on the sidewall of the tire where the sidewall flexes away, thus making it difficult to break the bead.

The present invention seeks to provide a bead breaking machine that is easy to operate, uncomplicated, portable, powerful, fast, lightweight, inexpensive, and which easily breaks the bead of even the heaviest duty truck, aircraft and construction equipment type tires, as well as smaller, light duty tires.

The current invention features a bead breaker apparatus that comprises a rugged, lightweight, upright frame. The frame is mounted upon a base having wheels that provide portability for the unit. The frame supports a pivoting hydraulic ram, upon which a bead breaking shoe is positioned upon a distal end. The frame also provides several pivot points for height adjustable arms that guide the shoe arcuately with respect to a tire wheel. The base supports a wheel positioning assembly, consisting of a locating extension with a rotatable pan upon which a tire and wheel are mounted. The pan is not always necessary as the tire can be simply placed under the ram foot with only a stop pin to keep it from sliding. The rotatable pan allows the bead breaking operator to rotate the tire with respect to the bead breaking shoe and ram apparatus. In this manner, the bead breaking machine can exert pressure upon many points of the tire about the full circumference of the wheel rim. Using this device to accomplish the bead breaking task is unexpectedly easy and efficient. The directed force of the hydraulically manipulated bead breaking shoe acts both inwardly and downwardly upon the tire bead in a direction toward the center of the wheel rim, providing for the unseating and demounting of some of the heaviest duty tires.

SUMMARY OF THE INVENTION

In accordance with the present invention, there is provided a portable, lightweight, rugged, bead breaking apparatus. The apparatus comprises a frame that is mounted upon a wheeled carrying base. The frame supports a pivoting hydraulic ram, upon which a bead breaking shoe is positioned upon a distal end. The ram pivots about an upper portion of the frame. Two height adjustable arms are attached to a mid-portion of the frame and provide a means by which the angle of the ram can be adjusted to accommodate different tire sizes. The base of the apparatus supports a wheel positioning assembly consisting of a removable locating extension with a rotatable pan upon which the tire is mounted, and can adjust telescopically with a hydraulic cylinder for the tire size or by adjustment holes on the pan locating extension. The rotatable pan allows the bead breaking operator to rotate the tire with respect to the bead breaking shoe and ram apparatus. The operator is able to work a lever actuating the hydraulic ram while the tire is rotated. In this manner, the bead breaking machine can exert pressure upon many points of the tire in a sequential manner. The force exerted all about the full circumference of the wheel rim breaks the bead of even the heaviest duty tires. The bead breaking task is accomplished easily by directing the force of the hydraulically manipulated bead breaking shoe inwardly towards the rim and then away therefrom. This forces the shoe under the rim flange and onto the bead where the force is needed.

It is an object of this invention to provide an improved bead breaking apparatus.

It is another object of the invention to provide a bead breaking machine that is simple, rugged, portable, reliable, powerful, fast and low in cost.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components of the apparatus of this invention will bear the same numbering and designations throughout the figures.

DESCRIPTION OF THE PREFERRED EMBODIMENT

Generally speaking, the invention features a portable, lightweight, tire bead breaking apparatus. The apparatus includes a vertically oriented frame disposed upon a wheeled base. A hydraulically actuated ram is pivotally mounted to the frame. A bead breaking shoe is attached to a distal end of the ram, and engages the beaded edge of a tire mounted upon a swivel pan rotatably mounted to the base with a reversible, removable locating extension. The bead breaking operator is able to simultaneously operate the ram, while rotating the tire disposed upon the swivel pan.

Figure 1:
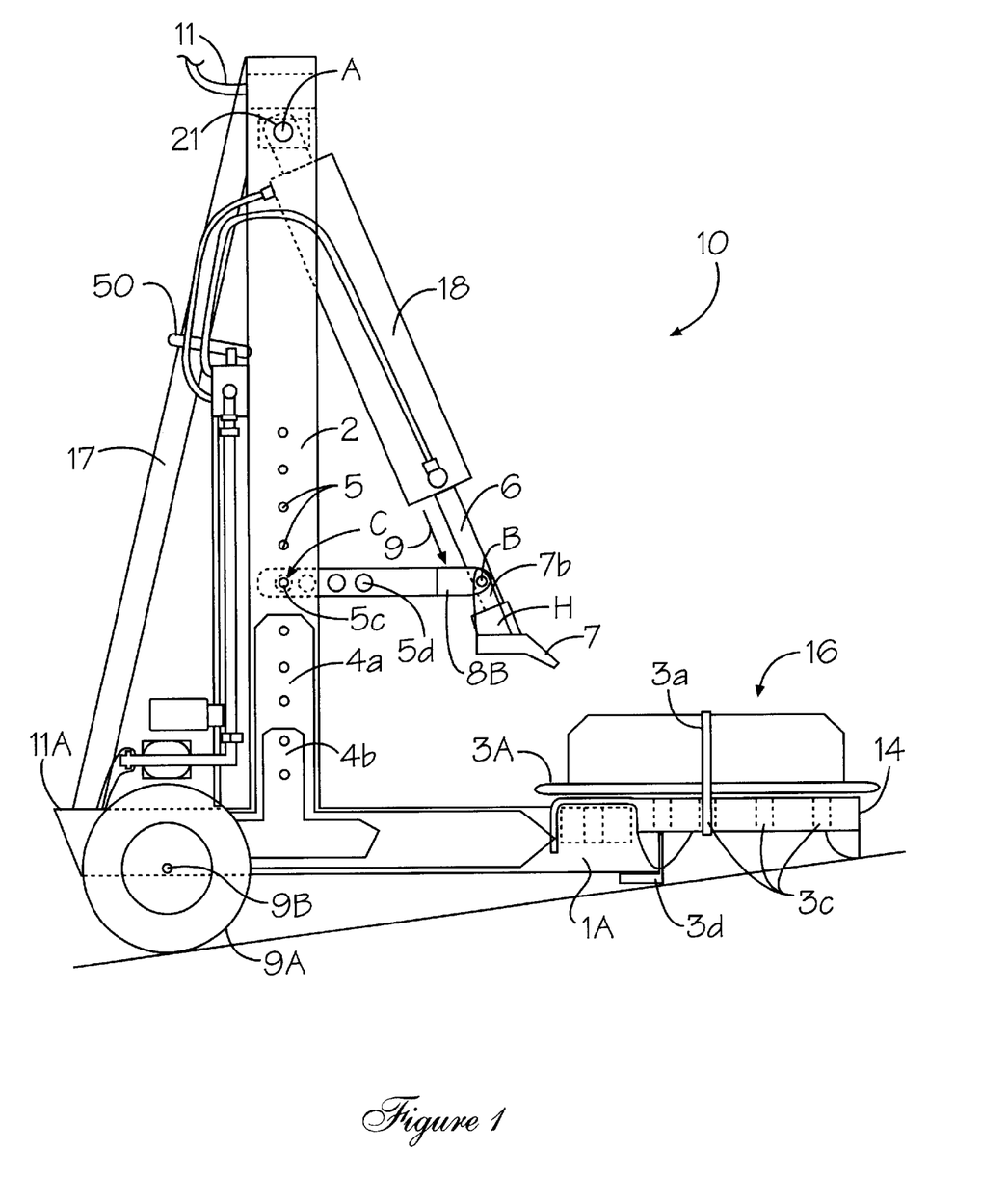
FIG. 1 illustrates a side view of the bead breaking apparatus of this invention.

Now referring to FIG. 1, the bead breaking device 10 of this invention is illustrated. The device 10 comprises vertically oriented frame members 2, which are mounted upon a base 1A.

When in use, the machine 10 has a slight lean forward to provide stability during operation. To move the machine, the operator pulls on the top handle 11 while pushing with his foot on the bottom cross bar 11A.

Figure 4:
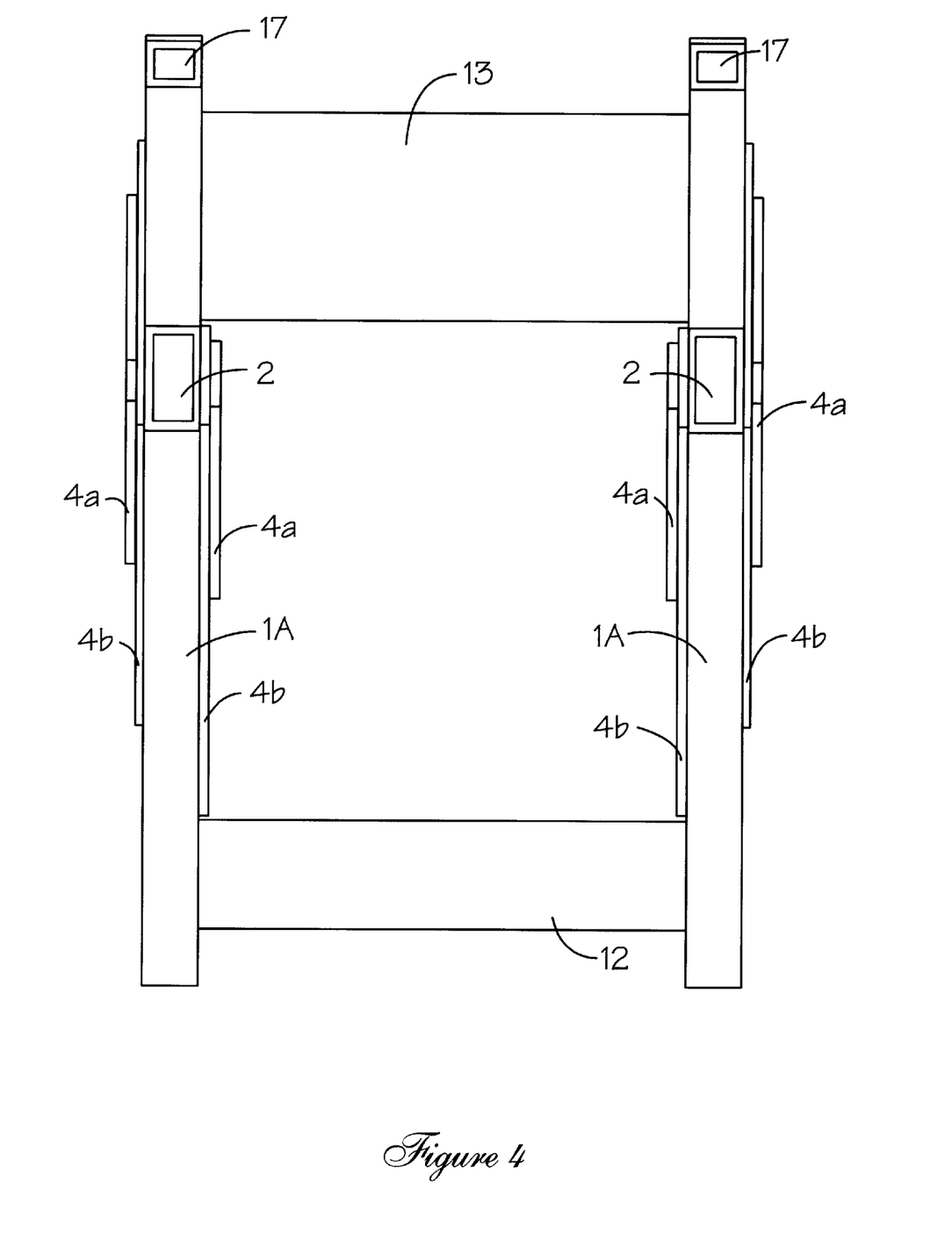
FIG. 4 illustrates a plan view of the base of the apparatus shown in FIG. 1.

A tire 19, whose bead 19A (FIG. 6) is to be broken from its wheel, is placed upon a swivel pan 3A. The swivel pan 3A is rotatively mounted to base member 1A by utilizing a removable and reversible pan locating extension 14, which is removably fitted over cross member 12 (FIG. 4). It should be understood that, for extremely large wheels, swivel pan 3A is not required. Thus, the invention is intended to cover the apparatus with and without the optional swivel pan 3A.

The base member 1A is horizontally and telescopically adjustable with respect to frame 2, by placing the removable pan locating extension 14 on cross member 12 or with hydraulic cylinder 15 (FIG. 7) described hereinbelow, thus allowing the swivel pan 3A to adjust its horizontal position with respect to frame 2. This is necessary to accommodate different sized tires, in both radius and width, mounted upon device 10. The swivel pan 3A is rotatively mounted with respect to base member 1A by virtue of a pin or spindle 3a that is fixed to swivel pan 3A along with a base support, and is rotatable in one of a plurality of bearings 3c, which is disposed in a pan locating extension 14. Friction pads 3d (each side) provide a resting surface for the front of the machine 10 and provide the correct tilt angle to stabilize the machine during use. Frame 2 is connected to base member 1A with side support plates 4a and 4b (FIGS. 1 and 4).

Wheels 9A rotatively disposed on the sides of base 1A by virtue of axle 9B, provide the device 10 with portability, when base member 1A is lifted upwardly, by pulling on the top handle 11 and pushing on the bottom crossbar 11A with the user's foot and then wheeling the bead breaker 10 to the desired location.

The hydraulically actuated ram 6 is slidably disposed in a hydraulic cylinder 18 (arrow 9), which is pivotally attached to the top of frame 2 at point A. A pusher foot or shoe 7 is attached to ram 6 at point H. Shoe 7 conforms to the shape of the wheel rim, having a concave leading edge and being downwardly tapered from a thicker to a thinner section, leaving a flat section at the top of foot 7 parallel to the base member 1A. Connecting arms 8A and 8B pivotally anchor the shoe 7 to frame 2, about pivot points C, as shown in more detail in FIG. 3. Connecting arms 8A and 8B are pivotally connected to shoe 7 at points B on shoe extensions 7b. Shoe extensions 7b provide clearance between arms 8A and 8B and the tire 19. This assembly helps provide a downward and inward motion on the tire and rim. The pivot points C are adjustable, by virtue of the spaced-apart holes 5 disposed in frame 2, which allow locking pins 5c to secure the connecting arms 8A and 8B (FIG. 3) to different heights along the vertical frame 2, as shown in FIG. 1. Coupled with the use of locking pin holes 5d spaced apart along arms 8A and 8B, the adjustment of the connecting arms 8A and 8B about frame 2 alters the angle of the ram 6 about pivot A, which in turn allows the shoe 7 to adjust to different wheel rim sizes. Connecting arms 8A and 8B, with locking pin holes 5d, also adjust the distance of the shoe 7 from the center 3a of the pan 3A. The shoe 7 is anchored to ram 6 by collar 26.

Figure 3:
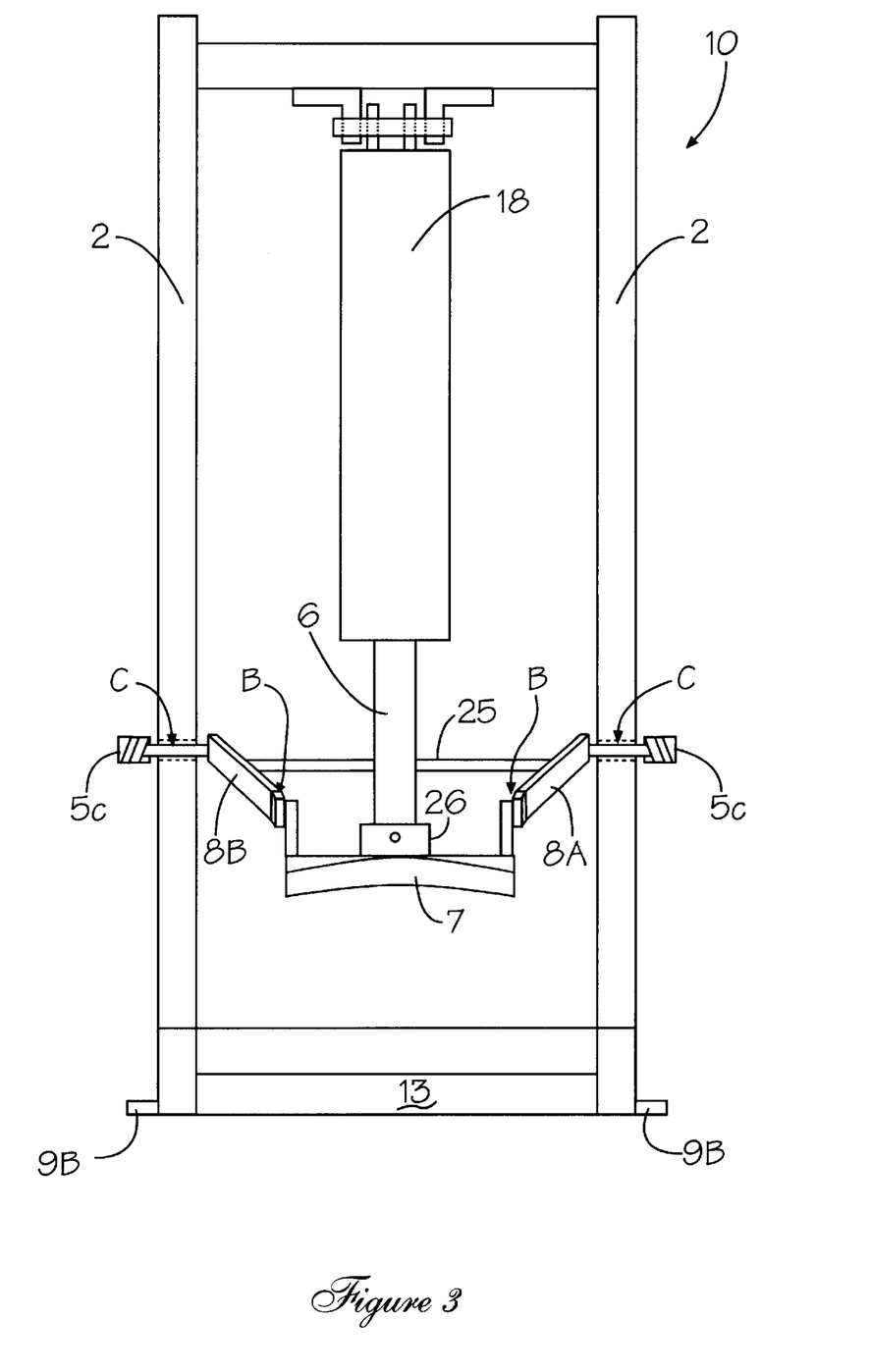
FIG. 3 depicts a front view of the bead breaking apparatus illustrated in FIGS. 1 and 2.

Cross member 25 provides structural rigidity between connecting arms 8A and 8B, as illustrated in FIG. 3. Likewise, a crossbar 17 provides structural rigidity between the frame 2 and base 1A, as depicted in FIGS. 1 and 4.

Referring again to FIG. 2, an electrically powered motor 29 activates a pump 30 that pumps hydraulic fluid from reservoir 32, which is defined by the hollow in base plate 13 attached to base 1A, as illustrated in FIG. 4. The pump 30 is rotatively driven by motor 29 through a coupling 37. The pump 30 is secured to the base plate 13 by means of a flange 43. It should be understood that using a gasoline, propane or diesel internal combustion engine or other remote pumping or power source (not shown), in lieu of the electric motor 29, is within the scope of this invention.

Figure 2:
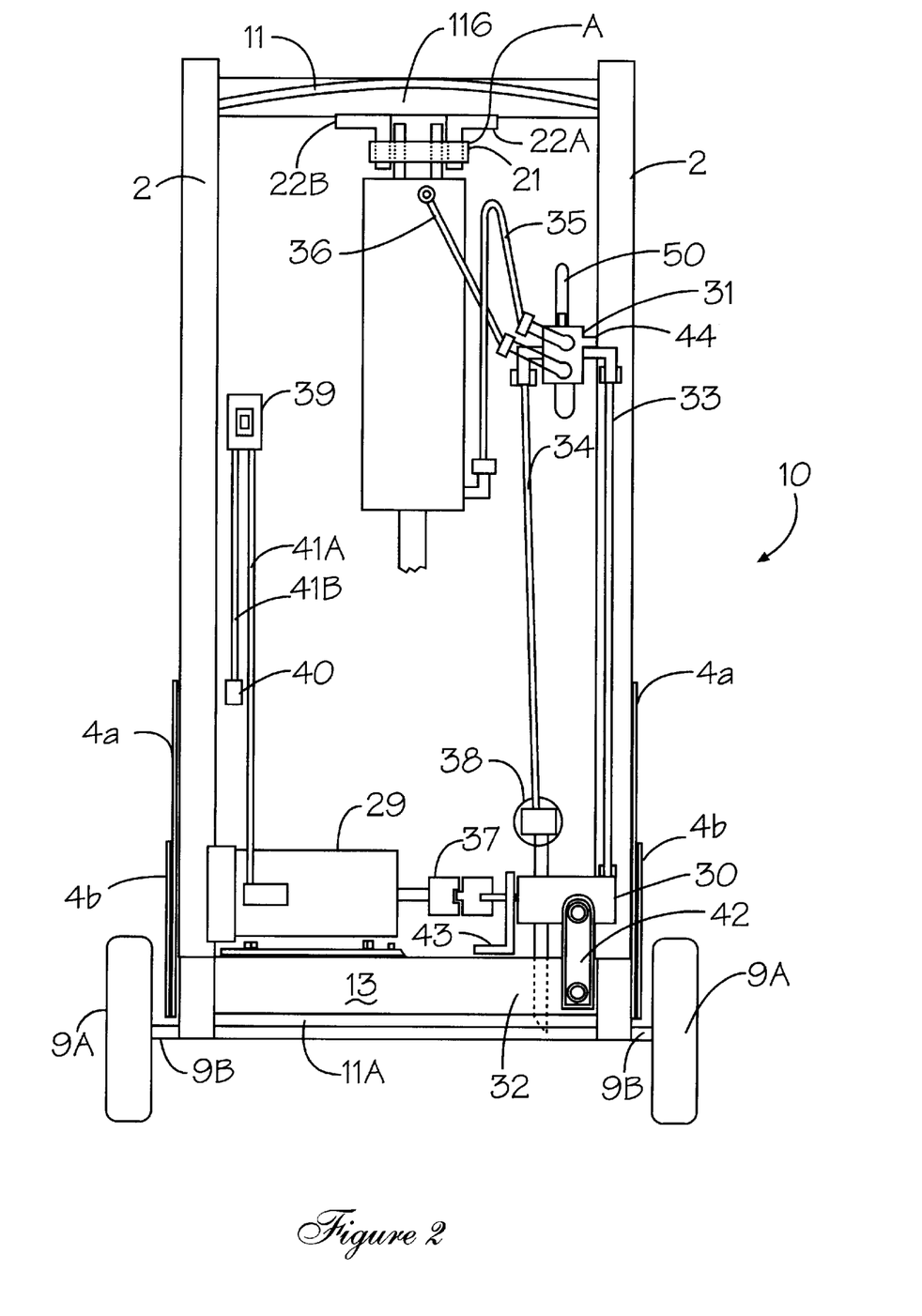
FIG. 2 shows a back view of the bead breaking apparatus depicted in FIG. 1.

An electrical switch 39 activates motor 29, via a line cord 41A. A power cord 41B is attached to the electrical switch 39 and is plugged into a conventional power outlet (not shown) via plug 40.

An actuation lever 50 controls the flow of hydraulic fluid from the reservoir 32 in plate 13, and delivers the fluid to the hydraulic cylinder 18 that drives ram 6 forward toward the tire 19 to be demounted by shoe 7 attached to ram 6. The lever 50 is pivotally mounted upon a hydraulic control valve 31. The fluid returns to reservoir 32 via return conduit 34. The oil is drawn by pump 30 from reservoir 32 via conduit 42. An oil filter 38 is disposed in line 34 to clean the fluid, which enters hydraulic cylinder 18 through conduit 36 or 35, depending on the direction of motion of ram 6. Return fluid from hydraulic cylinder 18 is returned to the hydraulic control valve 31 via conduit 35 or 36, and vice versa, depending on which way the control lever is pushed, thus controlling the direction of the cylinder 18.

A double acting piston is used in cylinder 18; it has power on the return stroke. This double acting piston is important to the operation of the machine: the operator can pull the bead breaking foot 7 away from the tire to get ready to engage in the next position.

The hydraulic cylinder 18 is pivotally fixed by pin 21 at pivot point A through flanges 22A and 22B mounted to the crossbar 116 disposed between frame members 2.

Actuation lever 50 is pivotally mounted upon hydraulic control valve 31, which is secured to frame 2 at point 44. The swivel pan 3A allows the bead breaking operator to rotate the tire 19 with respect to the bead breaking shoe 7 and ram 6. The operator is able to work a lever 50 actuating the hydraulically actuated ram 6 with one hand, while simultaneously or sequentially rotating the tire 19, via swivel pan 3A. In this manner, the bead breaking machine 10 can exert pressure upon many circumferential points of the tire 19 in a sequential manner. The force exerted all about the full circumference of the tire 19 easily breaks the bead of even the heaviest duty tires. The bead breaking task is accomplished by directing the force (arrow 9) of the hydraulically manipulated bead breaking shoe 7, acting downwardly upon the bead edge of the tire 19A, in a direction first toward and then arcuately away from the center of the wheel rim 19.

Figure 5:
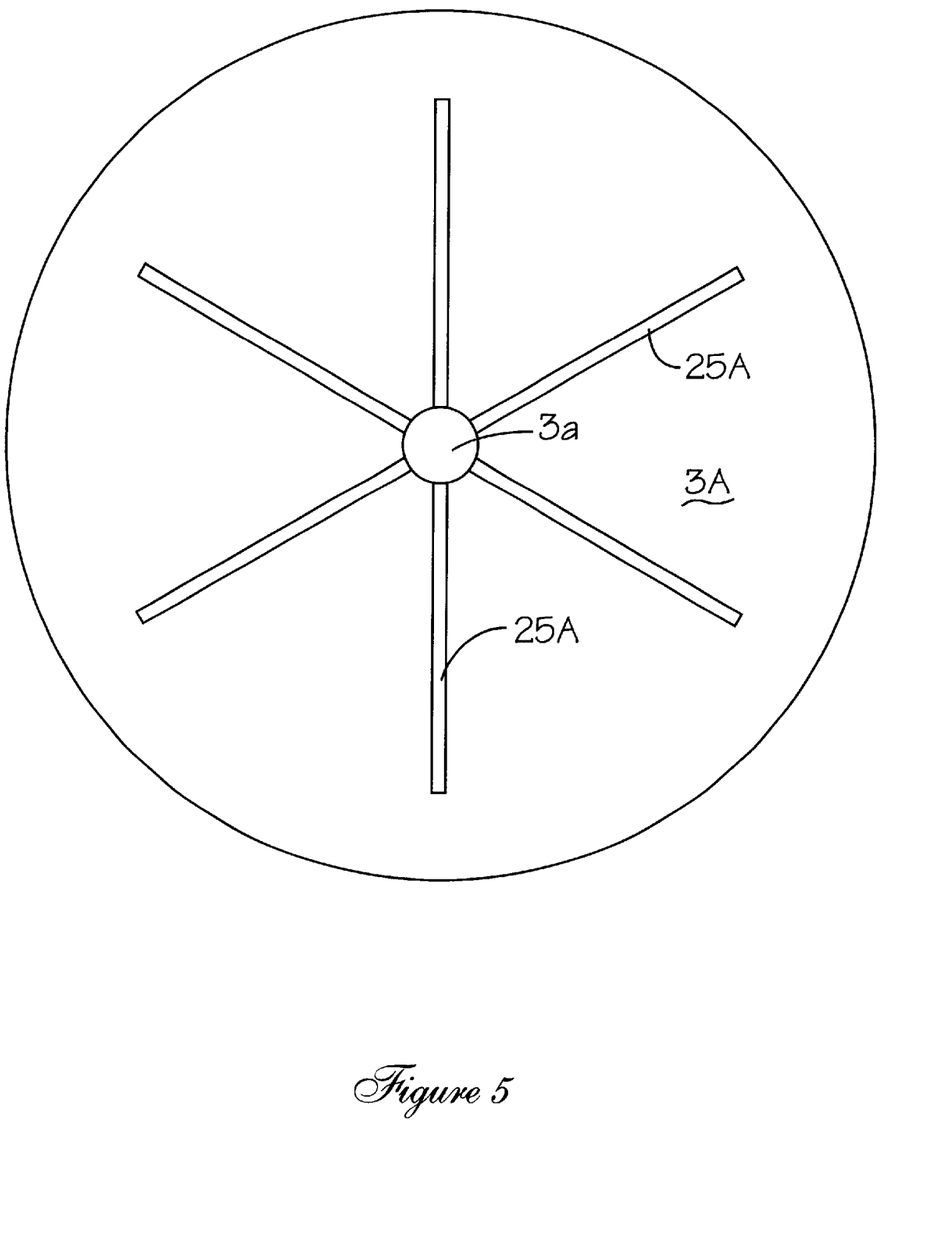
FIG. 5 shows a top view of the wheel pan for the apparatus depicted in FIG. 1.

Referring to FIG. 5, the removable swivel pan 3A is shown in plan view. The swivel pan 3A has radial locators 25A to center and position the rim of the tire 19 (FIGS. 1, 6 and 7) to provide structural support for heavy duty tires. Swivel pan 3A can be manufactured in a number of different sizes and shapes, depending upon the tires and wheels to be handled. A tire 19 to be demounted from its wheel is placed on top of the swivel pan 3A, which is rotatable about its center pin 3a.

Figure 6:
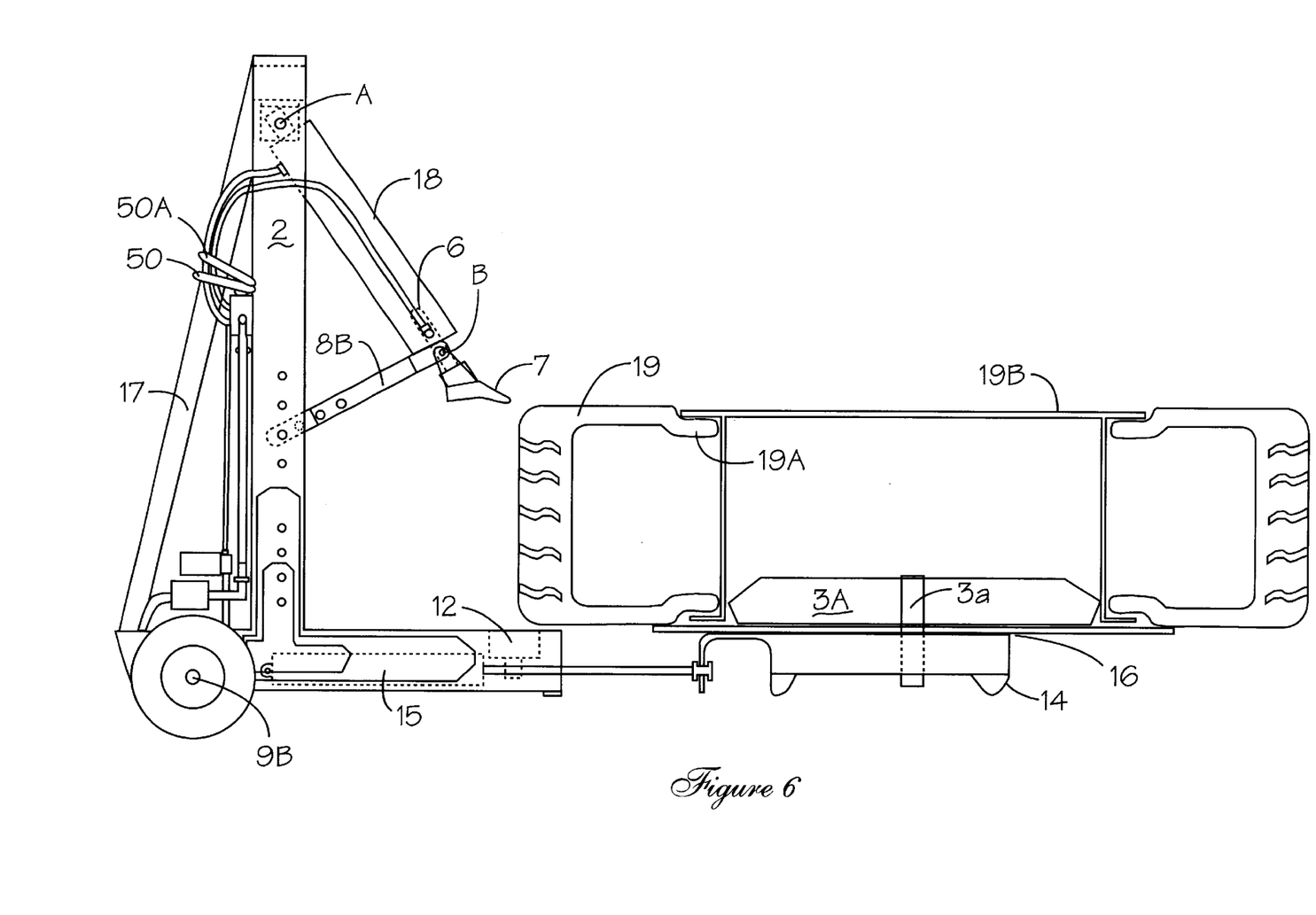
FIG. 6 shows the wheel positioning assembly with pan locating extension being extended for initial bead breaking operation.

Referring now to FIG. 6, the wheel positioning assembly 16 is shown in its extended position, when the bead breaking operation begins. The assembly 16 can be extended by hand by placing the leftmost, channel end of wheel positioning unit 14 over cross member 12 and placing wheel pan 3A in an appropriate bushing 3c (FIG. 1). FIG. 1 shows the manual technique of extending the assembly 16, which is useful for small tires where location of foot 7 gives adequate clearance for loading and unloading the tire 19. The pan 3A is oriented by placing the center pin 3a in the appropriate bearing hole 3c, prior to placing the tire and rim 19 on locating pan 3A.

Wheel positioning assembly 16 can also be hydraulically extended, with suitable mechanisms installed. The wheel positioning assembly 16, being hydraulically extended and retracted, is especially useful when handling large (wide) tires that are difficult or unwieldy to maneuver. Rather than attempt to position large tires on swivel pan 3A near the ram 6 and shoe 7, the assembly 16 can be hydraulically extended from the machine 10 to allow easier tire placement.

Figure 7:
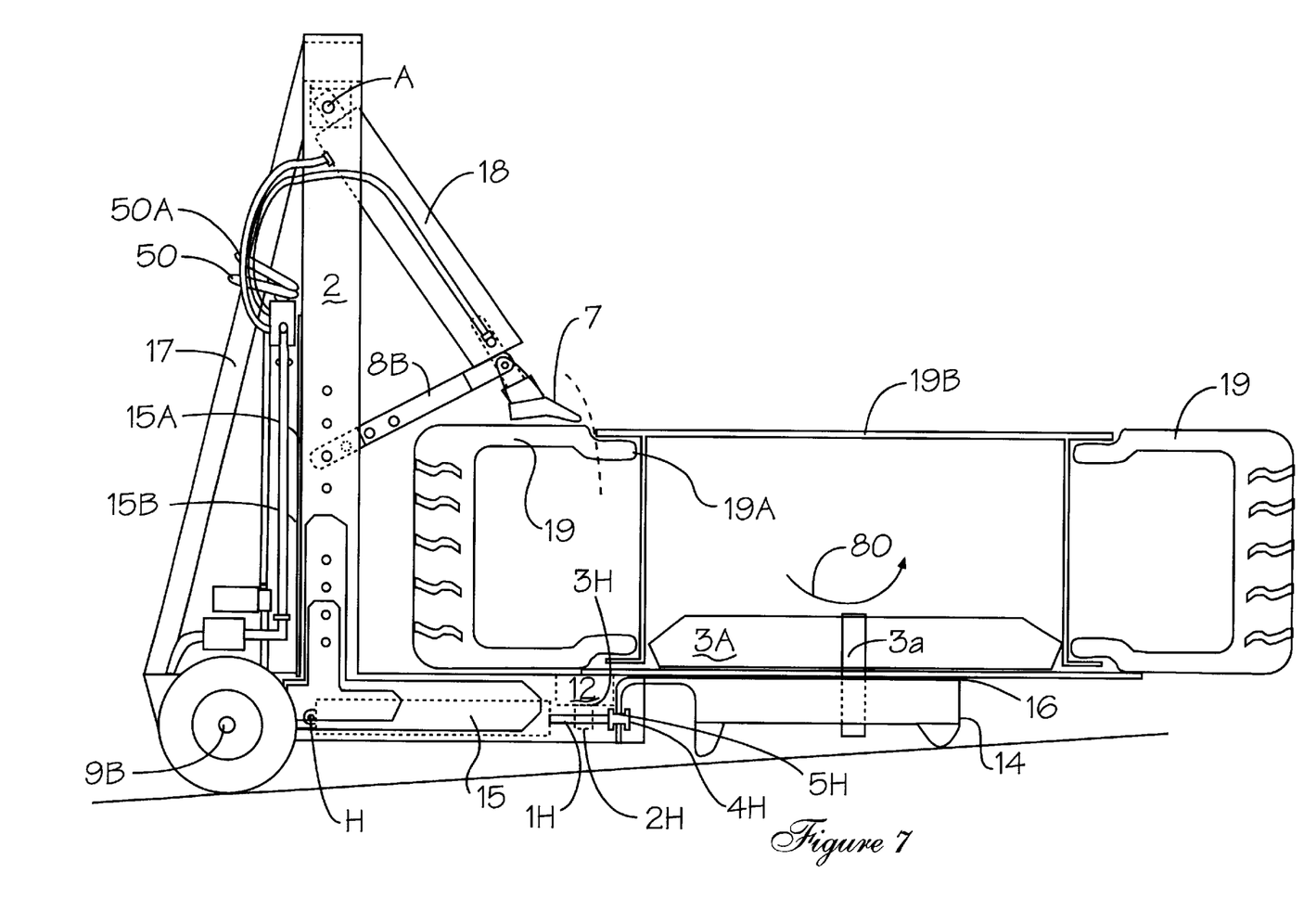
FIG. 7 shows the wheel positioning assembly with pan locating extension being retracted for the end of the operation.

Referring now to FIG. 7, hydraulic cylinder 15 is mounted to plate 13 at point H while ram 1H is guided and supported by bushing 2H, which is mounted to cross member 12 at point 3H. Ram 1H has a grooved diameter endpiece 4H, fitted to a slot 5H in the pan locating extension unit 14 in the leftmost channel end of the unit 14, at slot 5H, thus making the extension unit 14 easily removable. A control valve lever 50A is used to retract or extend the ram 1H and thus the wheel position in assembly 16, in relation to the base member 1A. Hydraulic fluid is transferred to and from control valve 31 to the cylinder 15 via hydraulic lines 15A and 15B.

The wheel positioning assembly 16 is hydraulically retracted, once the tire is disposed on swivel pan 3A, so that foot 7 can be engaged with the bead 19A of tire 19. Once the bead 19A is broken, the tire 19 is rotated (arrows 80) upon swivel pan 3A until the entire tire 19 is separated from wheel or rim 19B. After the bead 19A is broken on one side, with the aid of the wheel positioning assembly 16, if needed, the tire 19 is turned over, and the bead of the other side of the tire is broken.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A bead breaking machine, comprising:

a base;

a frame supported upon said base, said frame carrying an actuatable ram that is pivotally mounted for arcuate movement with respect to said frame via control arm means disposed therebetween, said actuatable ram for supplying a bead breaking force upon the bead of a tire in a direction downwardly and then away from a rim of a tire wheel supporting said tire by reason of said arcuate movement;

a shoe mounted to said ram for engaging said tire when said ram is actuated, in order to force said tire away from said tire wheel;

actuation means operatively attached to said ram for actuating said ram, and for causing said ram to push said shoe into engagement with said tire, causing said tire to separate from said tire wheel; and a rotatable support rotatively mounted to said base and supporting said tire for rotation about said base, whereby said tire can be rotated concurrently with actuation of said ram to break said bead by force directed circumferentially about said tire rim.

2. The bead breaking machine of claim 1, further comprising a wheel positioning assembly, telescopically expandable with respect to said frame, either by a hydraulic cylinder with a hydraulic control valve, or by adjustments by hole spacing.

3. The bead breaking machine of claim 1, wherein said base comprises wheels for moving said machine and providing portability thereto.

4. The bead breaking machine of claim 1, further comprising an adjustable connecting arm operatively connected to said frame and to said ram, providing a guiding motion to said shoe.

5. The bead breaking machine of claim 1, wherein said actuation means further comprises a hydraulic cylinder for driving said ram, and a hydraulic system including a fluid reservoir and pumping means for supplying fluid to said hydraulic cylinder.

6. The bead breaking machine of claim 5, wherein said hydraulic system further comprises a hydraulic control valve with a hand-held lever for actuating a flow of fluid from said reservoir to said hydraulic cylinder and to change the direction of the pressure fluid in order to expand or retract said hydraulic cylinder.

7. The bead breaking machine of claim 5, wherein said lever is disposed upon said frame so that an operator can actuate said ram, while rotating said tire upon said rotatable support.

8. A bead breaking machine, comprising:

a base;

a rigid frame supported upon said base, said rigid frame carrying an actuatable ram for supplying a bead breaking force upon the bead of a tire, said ram directing said bead breaking force downwardly and inwardly towards a rim of said tire;

a shoe pivotally mounted to said frame and connected to said ram for engaging said tire when said ram is actuated, in order to force said tire away from said rim; actuation means operatively attached to said ram for actuating said ram, and for causing said ram to push said shoe into engagement with said tire, causing said tire to separate from said tire rim; and a rotatable support rotatively mounted to said base and supporting said tire for rotation about said base, whereby said tire can be rotated concurrently with the actuation of said ram to break said bead by force directed thereupon.

9. The bead breaking machine of claim 8, wherein said ram is pivotally connected to said frame.

10. The bead breaking machine of claim 8, wherein said base comprises wheels for moving said machine and providing portability thereto.

11. The bead breaking machine of claim 8, further comprising adjustable connecting arms operatively connected to said frame and to said ram.

12. The bead breaking machine of claim 8, wherein said actuation means further comprises a hydraulic cylinder for driving said ram, a hydraulic system including a fluid reservoir, and pumping means for supplying fluid to said hydraulic cylinder.

13. The bead breaking machine of claim 12, wherein said hydraulic system further comprises a hydraulic control valve with a hand-held lever for actuating a flow of fluid from said reservoir to said hydraulic cylinder.

14. The bead breaking machine of claim 13, wherein said lever is disposed upon said frame so that an operator can actuate said ram while rotating said tire upon said rotatable support.

15. The bead breaking machine of claim 11, wherein said pumping means includes an internal combustion engine or electric motor or remote pumping or power source, a fluid pump, and a filter, said motor driving said pump to withdraw fluid from said fluid reservoir, and said filter disposed in a fluid line to filter contaminants from said fluid.

16. A bead breaking machine, comprising:

a frame carrying an actuatable ram for supplying a bead breaking force upon the bead of a tire in a direction downwardly and inwardly towards a rim of said tire;

a shoe mounted to said ram for engaging said tire when said ram is actuated, in order to force said tire away from said tire rim; and actuation means supported by said frame and operatively attached to said ram for actuating said ram, and for causing said ram to push said shoe into engagement with said tire, causing said tire to separate from said tire rim.

17. The bead breaking machine in accordance with claim 16, further comprising:

second actuation means supported by said frame and operatively attached to said ram for retracting said ram and for positioning said shoe for the next engagement with said bead of said tire.

18. The bead breaking machine in accordance with claim 16, further comprising:

a cross member connected to said frame; and an extension operatively connected to said cross member for extending and retracting a locating pin upon which a tire and rim are mounted, said extension comprising at least one stop pin for limiting movement of the rim of said tire.

* * * * *